Oct. 22, 1963

R. J. BROADWELL
VALVE MECHANISM 3,107,695

Filed May 18, 1959

INVENTOR
*Robert J. Broadwell*

BY *Cushman, Darby & Cushman*

ATTORNEYS

Oct. 22, 1963
R. J. BROADWELL
3,107,695
VALVE MECHANISM
Filed May 18, 1959
3 Sheets-Sheet 2
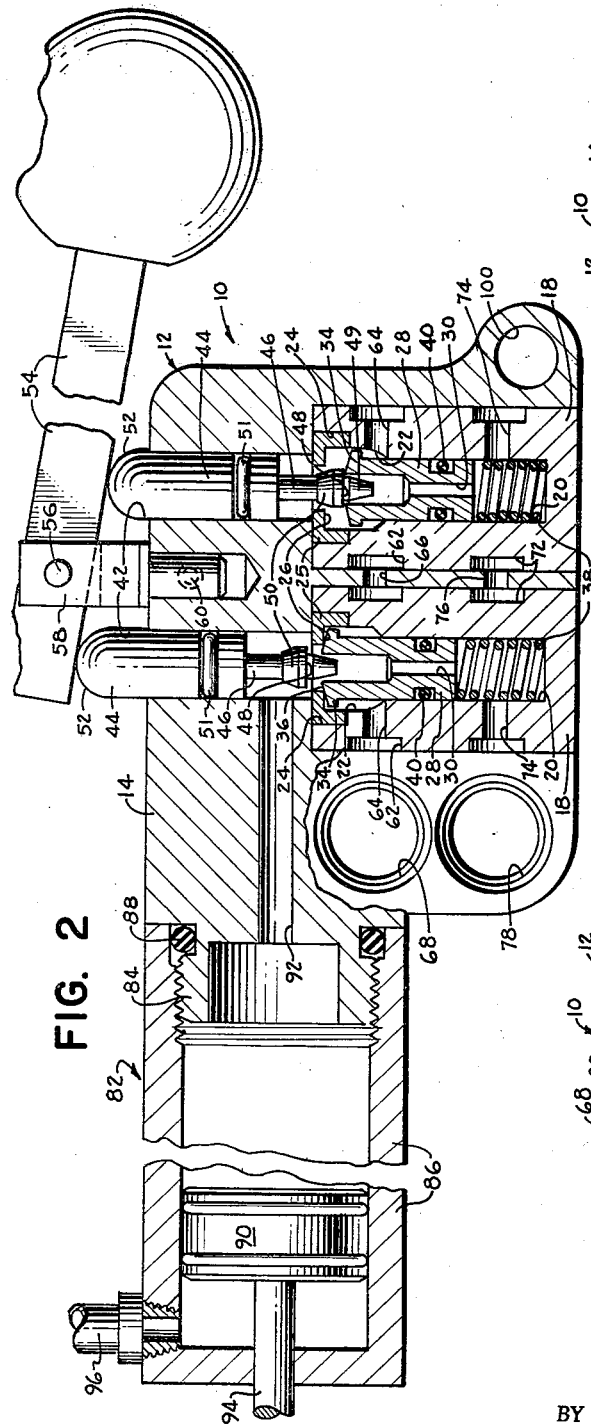
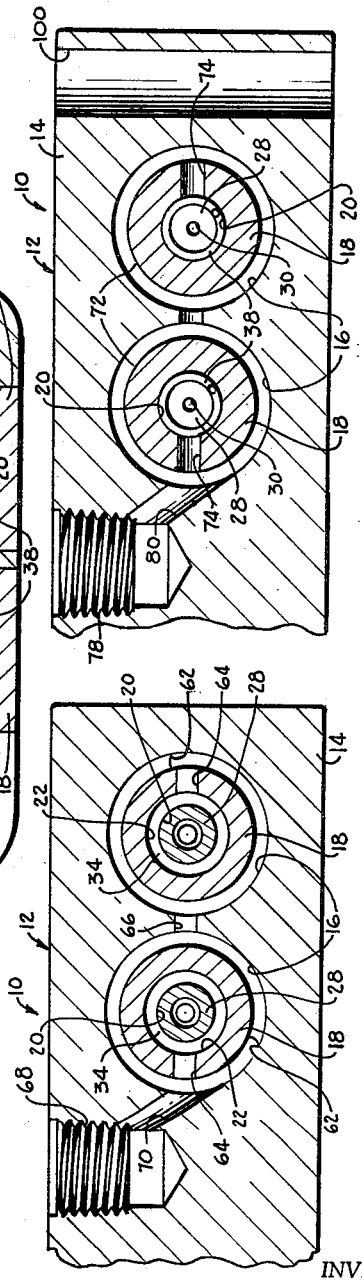
FIG. 2
FIG. 3
FIG. 4
INVENTOR
*Robert J. Broadwell*
BY *Cushman, Darby & Cushman*
ATTORNEYS

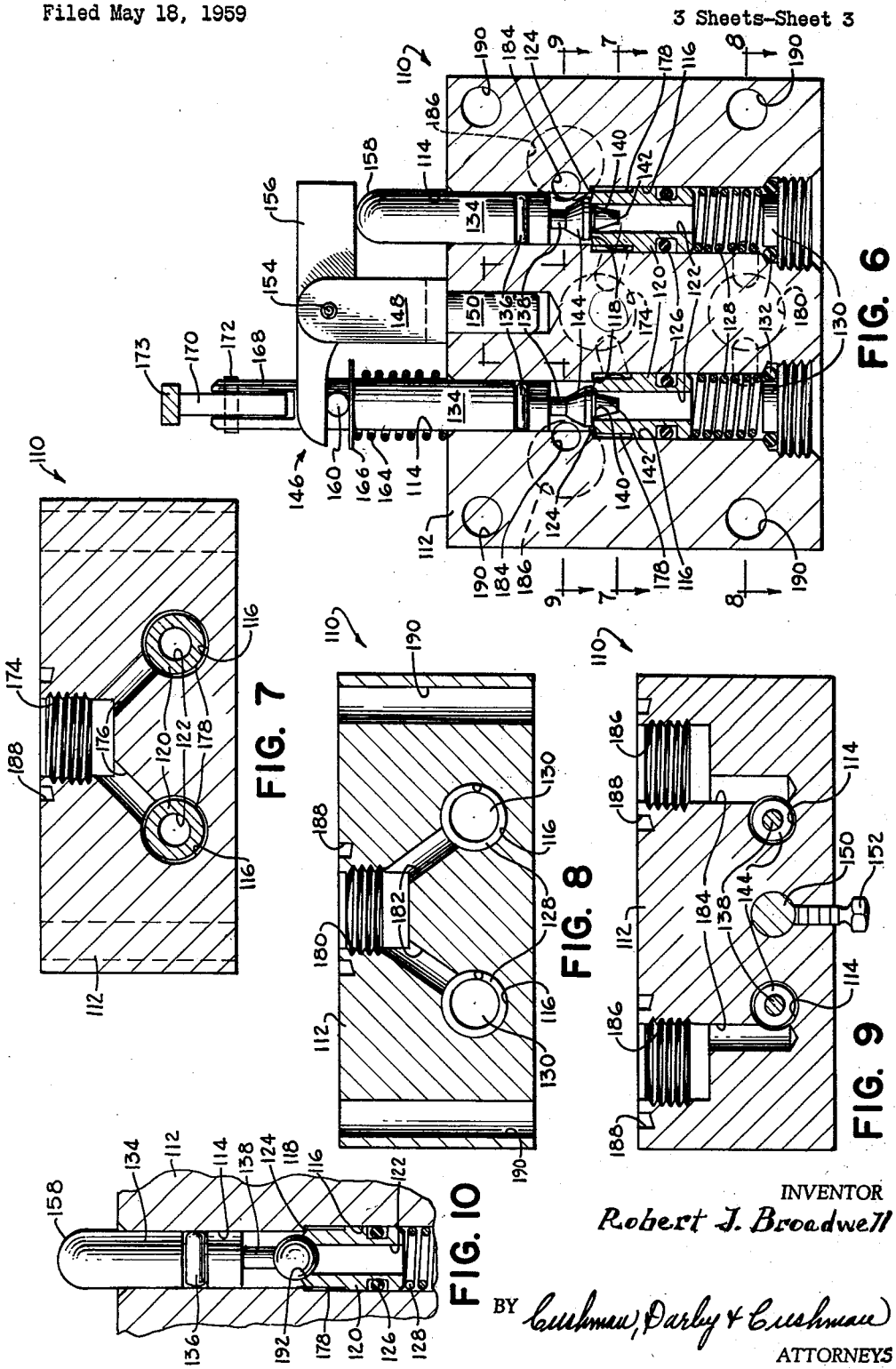

United States Patent Office 3,107,695
Patented Oct. 22, 1963

3,107,695
VALVE MECHANISM
Robert J. Broadwell, Cleveland, Ohio, assignor, by mesne assignments, to Aurora Corporation of Illinois, Chicago, Ill., a corporation of Illinois
Filed May 18, 1959, Ser. No. 814,065
19 Claims. (Cl. 137—636.1)

This invention relates to valve mechanisms and more particularly to improvements in valve mechanisms useful in industrial installations and the like for controlling fluid flow.

Valve mechanisms used in industrial installations, as, for example, in controlling fluid flow to a fluid motor such as a piston and cylinder or the like, are generally either of the spool type or of the poppet type. Spool valves usually embody a spool having one or more cylindrical lands thereon which are movable within a valve body bore to cover and uncover a port communicating laterally with the bore. These valves have the advantage of providing a positive regulation of flow, that is, the position of the spool land with respect to the port which it controls readily determines the quantity of flow through the port. On the other hand, spool valves require close manufacturing tolerances in order to effectively prevent leakage and, therefore, they are somewhat expensive.

Poppet valves usually embody a valve member which is arranged to engage and disengage a valve seat formed in a port to control the flow of fluid therethrough. These valves usually provide better sealing properties without danger of leakage, and can be produced economically since they do not require such high manufacturing tolerances. However, poppet valves usually do not provide the high degree of fluid flow regulation which is often required in industrial installations.

An object of the present invention is to provide an improved valve mechanism construction particularly useful in industrial installations which obtains the combined advantages of both spool type and poppet type valves, while, to a large extent, eliminating the disadvantages of each.

Another object of the present invention is the provision of a poppet type valve mechanism having improved flow regulating characteristics.

Still another object of the present invention is the provision of a four way valve mechanism for controlling flow to a double acting piston and cylinder unit or the like, which valve mechanism has a null position which positively prevents movement of fluid into and out of the cylinder at any position of the piston therein.

A further object of the present invention is the provision of a valve mechanism of the type described having improved means for regulating the speed of travel of the piston within the cylinder.

Still another object of the present invention is the provision of a valve mechanism of the type described having means for relieving excessive pump pressures in excess of the rated operative pressure thereof.

Still another object of the present invention is the provision of a valve mechanism of the type described in which the pump pressure directed thereto is controlled in such a way that the force necessary to actuate the valve mechanism decreases in response to an increase in pump pressure.

Still another object of the present invention is the provision of a valve mechanism which is simple in construction, efficient in operation and economical to manufacture and maintain.

These and other objects of the present invention will become more apparent during the course of the following detailed description and appended claims.

The invention can best be understood with reference to the accompanying drawings wherein an illustrative embodiment is shown.

In the drawings:

FIGURE 1 is a vertical sectional view, partly in elevation, of a valve mechanism embodying the principles of the present invention, the valve mechanism being shown in conjunction with a fluid motor in its flow blocking or null position;

FIGURE 2, is a view similar to FIGURE 1 showing the valve mechanism in one of its flow permitting or operative positions;

FIGURE 3 is a cross-sectional view taken along the line 3—3 of FIGURE 1;

FIGURE 4 is a cross-sectional view taken along the line 4—4 of FIGURE 1;

FIGURE 6 is a vertical sectional view of a modified form of valve mechanism embodying the principles of the present invention, the valve mechanism being shown in its null position;

FIGURE 7 is a cross-sectional view taken along line 7—7 of FIGURE 6;

FIGURE 8 is a cross-sectional view taken along line 8—8 of FIGURE 6;

FIGURE 9 is a cross-sectional view taken along line 9—9 of FIGURE 6; and

FIGURE 10 is a fragmentary cross-sectional view illustrating a modified form of the valve members.

Figure 5:
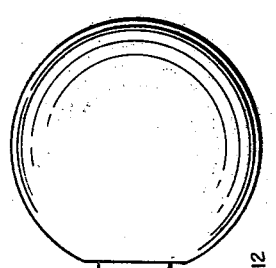
FIGURE 5 is a cross-sectional view taken along the line 5—5 of FIGURE 1.

Referring now more particularly to the drawings, there is shown in FIGURES 1–5 one form of a valve mechanism, generally indicated at 10, which embodies the principles of the present invention. The valve mechanism comprises a valve body 12 which includes a valve block 14 having a pair of parallel bores 16 extending upwardly from the lower end thereof. Mounted within each bore 16, as by a press fit, is a cylindrical valve body insert 18.

Each valve insert 18 has formed therein an axial cavity or bore 20 extending downwardly from the upper end thereof. Formed in the upper end of each bore 20 is a first counterbore 22 having a second counterbore 24 formed in the upper end thereof. Mounted in each of the second counterbores 24, as by a press fit, is a valve seat member 25 comprising a hollow cylindrical portion having an inwardly extending upper annular flange providing a downwardly facing valve annular seat 26.

Slidably mounted within each bore 20 is a valve member 28 having an axial passageway 30 extending therethrough, the upper end portion of each passageway being counterbored, as indicated at 32. The upper end of each valve member is provided with an outwardly extending annular flange 34 defining an upwardly facing, shallow, frusto-conical surface 36, the outer portion of which is arranged to engage, with a substantial line contact, the inner edge of the annular valve seat 26.

The surface 36 of each valve member 28 is resiliently urged into engagement with the associated seat 26 by any suitable means, such as a coil spring 38 disposed in the lower end of the associated bore 20 and having its lower end engaging the inner end of the associated bore and its upper end engaging the lower end of the associated valve member.

Any suitable means may be provided for effectively preventing leakage of fluid past the periphery of the valve members 28 within the bores 30. As shown, an O-ring seal 40 of a suitable sealing material is disposed within an appropriate annular groove formed in each valve member intermediate the ends thereof.

Slidably mounted within a smaller bore 42 formed in the valve block 14 in concentric relation with each of the bores 16 is a second valve plunger member 44 having a valve stem 46 extending downwardly therefrom. An annular flange formed on the lower end of each valve stem defines a downwardly facing annular surface 48 for engaging the inner peripheral edge of the frusto-conical surface 36 of the associated valve member 28, with a substantial line contact.

Extending downwardly from the surface 48 of each valve member 44 is a downwardly converging frusto-conical flow regulating element 49 arranged to engage within the counterbore 32 of the associated valve member 28. A second upwardly converging frusto-conical flow regulating element 50 is formed on each stem 46 above the associated lower flange.

Each valve plunger member 44 is sealingly mounted within its associated bore 42 by any suitable means, such as an O-ring, 51, and the upper end portion thereof extends outwardly of the valve block 14 and has its extremity formed in an arcuate surface 52. The arcuate surface 52 of each valve member 44 is engaged by a suitable actuating lever 54 pivotally mounted intermediate its ends as indicated at 56, within a yoke 58 suitably fixed to the valve block 14 between the valve members 44, as by a set screw 60.

It will be understood that the valve mechanism 10 is arranged to be operatively connected with a conventional pressurized fluid circuit including a pump and sump (not shown). To this end, each valve insert 18 has an upper annular groove 62 formed on the outer periphery thereof, each groove communicating with the associated counterbore 22, as by a radially extending port or passage 64. As best shown in FIGURE 3, the annular grooves 62 of both valve inserts 18 are connected in series with each other, by a passage 66 extending through the wall of the valve block between the bores 20, and with an interiorly threaded high pressure or inlet opening 68 formed in the block, by a port or passage 70 extending diagonally between the latter and the adjacent groove 62.

As best shown in FIGURE 4, each valve insert also has a lower annular groove 72 formed in the outer periphery thereof, each groove communicating with the lower end of the associated bore 20, by a radially extending passage 74. As before, the annular grooves 72 are connected in series with each other, by a port or passage 76 extending through the wall of the valve block between the bores 20, and with an interiorly threaded low pressure or exhaust opening 78 formed in the block, by a port or passage 80 extending diagonally between the latter and the adjacent groove 72.

The valve mechanism 10 is also arranged to control a suitable instrumentality in the pressurized fluid circuit, a preferable embodiment of such instrumentality being shown as a fluid motor in the form of a piston and cylinder unit, generally indicated at 82. The valve mechanism 10, as shown, is particularly adapted to cooperate with the cylinder and piston unit and, to this end, an exteriorly threaded nipple 84 is formed in the valve block for receiving one end of a cylinder 86 of the unit 82. Preferably, an O-ring seal 88 is provided to prevent leakage in the connection between the cylinder and nipple.

As best shown in FIGURE 5, the unit 82 also includes a piston 90 slidably mounted within the cylinder 86. The end of the cylinder on the side of the piston 90 adjacent the nipple 84 communicates with the adjacent bore 42, as by a port or passage 92 extending through the valve block between the nipple 84 and the bore 42 adjacent the associated valve seat member 26. Rigidly connected with the opposite side of the piston 90 is a piston rod 94 which extends outwardly through the adjacent end of the cylinder. The piston rod end of the cylinder communicates with one end of a conduit 96, the opposite end of which is engaged within an interiorly threaded opening 98 formed in the valve, the inner end of which forms a port or passage communicating with the other bore 42 adjacent the associated valve seat member.

*Operation*

It will be understood that the valve mechanism 10 combined with the piston and cylinder unit 82 may be employed in any desired installation where movement is desired in response to actuation of the lever 54. Moreover, it will also be understood that the actuating lever 54 can be replaced with other instrumentalities for actuating the valve mechanism. As shown in FIGURE 1, the valve mechanism 10 and combined piston and cylinder unit 82 are particularly adapted to be pivotally interconnected between two elements in a desired instrumentality. To this end, a transverse bore 100 is formed in the lower right hand corner of the valve block 14 as shown in FIGURE 1. The outer end of the piston rod is provided with a clevis 102. It will be seen that by suitably actuating the lever 54 the piston 90 can be moved within the cylinder to effect an expansion or contraction between the connection elements 100 and 102.

The lever 54 is normally resiliently biased by springs 38 into the flow preventing or null position illustrated in FIGURE 1. It will be understood that the pump of the pressurized fluid circuit is connected with the inlet opening 68 and that the opening 78 is connected to the sump of the circuit. The engagement of the surfaces 36 of the valve members 28 with their respective valve seats 26 serves to prevent flow of the pressurized fluid from the inlet opening 68 to the piston and cylinder unit 82. In addition, the surfaces 48 of the valve members 44 are disposed in contact with the inner peripheral edges of the surfaces 36 to prevent flow from the piston and cylinder unit 82 to the exhaust opening 78.

When it is desired to move the piston 90 to the right, as viewed in FIGURE 2, the outer end of the actuating lever 54 is moved downwardly. This movement has the effect of moving the right hand valve member 44 downwardly which, in turn, moves the associated valve member 28 downwardly through the engagement of the surface 48 with the surface 36, thus compressing spring 34. It will be seen that this downward movement of the cooperating valve members 44 and 28 will move the surface 36 of the latter downwardly away from the valve seat 26, thus communicating the associated counterbore 22 with the inlet opening 68 through the associated bore 64 and annular groove 62, port 66, and other annular groove 62 and port 70. The bore 42 associated with the downwardly moved valve members communicates through opening 98 and conduit 96 to the piston rod end of the cylinder 86, thus allowing pressurized fluid from the inlet opening 68 to enter therein.

It will be understood that the above communication of the piston rod end of the cylinder with the inlet opening will effect an increase in the fluid pressure in the opposite side of the cylinder thus causing the left hand valve member 44 to move upwardly in response to the upward movement of the adjacent end of the lever 54. This upward movement of the valve member 44 serves to move the surface 48 thereof away from the inner peripheral edge of the surface 36 of the associated valve member 28, thus permitting communication between the adjacent end of the cylinder and the exhaust opening 78 through port 92, associated bores 42, 32, 30, and 20, port 74, annular groove 72 and diagonal port 80.

A significant operative advantage of the present construction is that the amount of movement of the lever 54 away from the null position, shown in FIGURE 1, determines the rate of flow of fluid to and from the piston and cylinder unit 82. Thus, it will be seen that when the right hand valve member is initially moved downwardly to communicate the associated bore 42 with the associated counterbore 22, the flange on the associated valve member 44 will permit a predetermined low rate of flow through the opening defined by the valve seat flange. As the frusto-conical surface 50 moves adjacent and downwardly with respect to this opening, a greater amount of flow will take place. Conversely, the frusto-conical surface 49 in the left hand valve member 44 provides a variable restriction within the counterbore 32 which operates to effect a relative slow rate of flow during the initial upward movement and a progressively greater rate of flow during subsequent upward movement.

It will be seen that the rate of movement of the piston 90 within the cylinder 96 can thus be controlled and such movement is halted by simply releasing the actuating lever 54, the springs 38 of the right hand valve member 28 serving to resiliently bias the latter upwardly so that the associated valve member 44 will move the actuating lever into its null position as illustrated in FIGURE 1. In this position the fluid is positively maintained within the cylinder by virtue of the engagement of the surfaces 36 with the surfaces 26 and 48 respectively. Thus, the present valve mechanism 10 is operative to positively prevent flow of fluid into or out of the cylinder 86 in any desired position of the piston therein.

It will be understood that where movement of the piston 90 in a direction toward the piston rod end of the cylinder is desired, the outer end of actuating lever 54 is moved upwardly so that the left hand valve member 44 is moved downwardly and the right hand valve member 44 is moved upwardly. In this position, which is opposite to that illustrated in FIGURE 2, the piston rod end of the cylinder is connected with the exhaust opening 78 and the opposite end of the cylinder is connected with the inlet opening 68. Again, by releasing the actuating lever 54 the valve members will assume their null positions, as shown in FIGURE 1, under the action of springs 38.

It can be seen that the valve mechanism 10 is simple in construction and all parts can be readily machined without requiring too severe manufacturing tolerances. Moreover, aside from the press fits of the valve body inserts 18 within bores 16, fluid leakage can occur only around the valve members and such leakage is readily prevented by conventional O-rings. The valve mechanism 10 is such that it is resiliently urged into a null position preventing fluid flow and thus positively maintaining an instrumentality operated thereby, such as a hydraulic piston and cylinder unit against movement. It will be noted that the engagement of the surfaces 36 with cooperating surfaces 26 and 48 is such that they tend to be self-seating so as to substantially eliminate the tendency toward leakage as a result of wear. Moreover, these surfaces will tend to wear equally so that contact is at all times maintained when the valve mechanism is in its null position.

Thus, the valve mechanism 10 provides the advantages of a poppet type valve in that a positive valve seating is provided by a construction requiring minimum manufacturing tolerances. In addition, the frusto-conical surfaces 49 and 50 enable the valve mechanism to control the rate of flow and hence the rate of movement of any instrumentality controlled thereby, such as the piston and cylinder unit 82, in the same manner as a spool valve. It will also be noted that the lower frusto-conical elements 49 serve to positively maintain the associated valve members 28 and 44 in proper axial alignment.

It will also be noted that the pump pressure communicating with the counterbores 22 contacts the valve members 28 such that there is a greater upwardly facing surface area provided by the shallow frusto-conical surface 36 disposed outwardly of the engagement of the valve seat surface 26 therewith than there is downwardly facing surface area provided by the valve member flanges 34. In this way, pump pressure within the counterbores 22 tends to move the valve members 28 in a downward direction to compress the springs 38. Stated differently, the pressure within the counterbores 22 tends to move the valve members downwardly since they provide a resultant upwardly facing surface area which is equal to the area defined by two concentric circles, the outer circle having a diameter equal to the diameter of the bore 20 or the valve member 28 slidable therein and the inner circle having a diameter equal to the diameter of the circular line of contact of the seat 26 with the surface 36.

With this arrangement, downward movement of the valve members 44 requires a lesser force as the pump pressures increases. Therefore, with the highest operating pressures, the actuating lever 54 will be relatively easy to move. This feature is important in considering actuating instrumentalities which have a substantially constant force output as, for example, solenoids or the like.

In conjunction with the above, it will be noted that the various flow-restricting openings within the valve mechanism 10 will be formed of a desired size in accordance with the rated capacity of the valve for a particular application. In order to insure that the valve will at all times be effectively utilized and not employed in installations where pump pressures greatly in excess of those of rated capacity are used, the strength of the springs 38 is so chosen that a pressure within the counterbores 22 slightly in excess of rated pump pressure acting on the resultant upwardly facing surface noted above will have the effect of depressing the same, thus opening all of the valve seats. With this arrangement, the valve mechanism is constructed so that it will be inoperative when utilized with pump pressures in excess of rated pump pressures.

Referring now more particularly to FIGURES 6–9, there is shown another form of valve mechanism, generally indicated at 110, which embodies the principles of the present invention. The valve mechanism 110 comprises a valve body 112 which is preferably in the form of a valve block having a pair of parallel bores 114 extending therethrough, each bore having a counterbore 116 formed in one end thereof defining an annular shoulder 118 which forms a valve seat between each bore 114 and counterbore 116. Slidably mounted within each counterbore 116 is a valve member 120 having a central bore 122 extending axially therethrough. The end of each valve member 120 adjacent the valve seat 118 is formed with a shallow frusto-conical surface 124 which is arranged to engage the valve seat 118 with a substantial line contact. In order to prevent leakage past the periphery of each valve member 120 within the associated counterbore 116, suitable sealing means may be provided, such as an O-ring seal 126 mounted within an appropriate annular groove formed in the periphery of each valve member 120.

A coil spring 128 is disposed within each counterbore 116, and has one end thereof in engagement with the associated valve member 120 and its opposite end in engagement with a plug 130 threadedly engaged within the end of the associated counterbore 116 and sealed therein as by an O-ring 132. It will be seen that the springs 128 serve to resiliently urge the valve members 120 upwardly so that the surfaces 124 thereof will engage the valve seats 118.

Mounted within each of the bores 114 is a second valve plunger member 134, each having a suitable sealing means therein for engaging the wall of the associated bore 114, such as an O-ring 136 mounted within an appropriate annular groove formed in the periphery thereof. Extending downwardly and forming an integral part of each valve plunger member 134 is a valve stem 138 having an annular flange formed on the end thereof providing a downwardly facing annular surface 140 for engaging the inner periphery of the frusto-conical surface 124 of the associated member 120. Extending downwardly from the surface 140 of each valve plunger member 134 is a frusto-conical element 142 arranged to move through the bore 122 adjacent the inner periphery of the frusto-conical surface 124 of the associated valve member 120. Formed on each valve stem above the surface 140 is a second frusto-conical element 144 which is arranged to move through the bore 114 adjacent the inner periphery of the valve seat 118.

Any suitable means may be provided for actuating the valve plunger member 134 and as shown in FIGURE 6, there is provided a cam actuating assembly, generally indicated at 146, which includes a yoke 148 suitably mounted within the valve body 112 in a position between the bores 114 therein, as by a rigid pin or shaft 150 extending in an appropriate aperture formed in the valve body and fixed therein, as by a set screw 152 (see FIGURE 9). Pivotally mounted within the yoke 148, as by a pivot pin 154, is a rocker arm 156 having one end thereof disposed in overlying relation to the upper end of one of the valve plunger members 134, such end being provided with an arcuate arm engaging surface 158.

The other valve member 134, which is disposed on the left hand side as viewed in FIGURE 6, extends above the right hand valve plunger member 134 and is suitably apertured to receive a transversely extending shaft 160. The adjacent side of the rocker arm 156 is bifurcated and arranged to engage the upper surface of the shaft 160. Preferably, a coil spring 164 is mounted in surrounding relation to the left hand valve member and has its upper end in engagement with a collar or washer 166 mounted beneath the shaft 160 and its lower end in engagement with the valve body. The end of the left hand valve member 144 extends upwardly from the shaft 160 and is bifurcated as indicated at 168 to receive therebetween a cam roller 170 journalled thereon as by a shaft 172 extending through the roller and bifurcated valve member end 168. It will be understood that the cam roller 170 is arranged to engage any suitable cam actuating track schematically illustrated at 173.

As best shown in FIGURE 7, a high pressure or pump inlet opening or port 174 is formed in the valve body and extends transversely therein in a position between the valve seats 118. The inlet opening 174 is commuicated with each of the counterbores 116 at a position adjacent the associated valve seat 118 by a pair of diagonal ports or passages 176 extending between the inner end of the inlet opening 174 and the counterbores 116 respectively. It will be noted that each of the valve members 120 has its outer periphery adjacent the frusto-conical surface 124 relieved, as indicated at 178, to more readily permit fluid from the inlet opening and passages 176 to enter the counterbores 116.

As best shown in FIGURE 8, an exhaust or low pressure opening or port 180 is formed in the valve body 112 in parallel relation to the inlet opening. The exhaust port 180 communicates with the lower end of each of the counterbores 116 as by a pair of diagonal ports or passages 182 extending from the inner end of the opening to the counterbores 116 respectively.

As best shown in FIGURE 9, a passage or port 184 is formed in the valve body with one end thereof in communication with the outer periphery of each bore 114 in a position adjacent the associated valve seat 118. The opposite end of each passage 184 communicates with a larger opening or port 186.

The valve mechanism 110, like the valve mechanism 10 previously described, is particularly adapted for controlling a fluid motor such as a piston and cylinder unit. The valve mechanism 110 is arranged so that it may be readily attached to a manifold block, (not shown) of conventional construction, having passageways formed therein to communicate with the openings 174, 180 and 186. To this end, an annular groove 188 is formed in the valve body in concentric relation to each of the openings 174, 180 and 186. The grooves 188 are arranged to receive annular sealing elements (not shown), such sealing elements being arranged to engage with the manifold block. In addition, the valve body has formed therein suitable apertures 190 through which bolts or other fastening elements (not shown) may extend to effect securement of the valve body to the manifold block. Moreover, it will be noted that the openings 174, 180 and 186 are interiorly threaded to receive conventional hose fittings for use when the manifold is not employed.

The operation of the valve mechanism 110 is substantially the same as the operation of the valve mechanism 10 described above. That is, the flow of fluid is controlled by relative movement of the valve members 120 and 134 in the same way that the flow of fluid is controlled by relative movement of the valve members 28 and 44 previously described. It will be understood, however, that with the cam actuating assembly 146 as shown in FIGURES 6–9 the spring 164 is of a strength sufficient to effect upward movement of the left hand valve plunger member 134 and downward movement of the right hand valve plunger member against the action of its associated spring 128 through the operation of the shaft 160 and rocker arm 156. In this way the cam roller 170 need only engage a single cam track surface, which surface serves to move the left hand valve member 134 downwardly from its extreme upper position to its extreme downward position. In the latter position the pressure communicating within the bore 114 associated with the right hand valve member 134 will effect upward movement of the latter in the same manner as the valve plunger members 44 are moved upwardly, as previously described. Of course, the cam surface also serves to maintain the valve members in their null position as shown in FIGURE 6.

It will also be noted that the valve members 120 and 134 of the embodiment of FIGURES 6–9 provide the same sealing and wearing characteristics of the valve members described above in connection with the embodiments disclosed in FIGURES 1–5.

It will also be noted that the diameter of the circle of line contact between each surface 124 and the inner periphery of the associated valve seat 118 is less than the diameter of the associated counterbore 116 so as to provide a resultant upwardly facing surface area which is acted upon by the pressure from the high pressure port 174 to tend to move the associated valve member 120 downwardly against the action of the associated spring 128. Also, as before, the strength of the spring is such that pump pressures in excess of rated pump pressure will have the effect of unseating the valve members 120.

The provision of the frusto-conical elements 142 and 144 enable the valve mechanism 110 to meter the flow to and from the working ports 186 in the same manner as previously described in connection with the embodiment disclosed in FIGURES 1–5. In this regard it will be noted that other constructions may be utilized to achieve this metering action.

In FIGURE 10 there is disclosed a modified form of the valve embodiment 120 in which the end thereof adjacent the valve seat 118 is formed to provide an outer frusto-conical surface 190 arranged to engage the inner periphery of the valve seat 118 with a substantial line contact and an inner frusto-conical surface 192 providing a valve seat for engagement, with substantial line contact, by a spherical element or ball 194 formed on the lower end of the stem 138 in lieu of the flange surface 140 and frusto-conical elements 142 and 144 previously described. It will be seen that the ball 194 serves to meter the flow in both directions in much the same manner as the two frusto-conical elements 142 and 144 previously described. Of course, the construction illustrated in FIGURE 10 may be utilized in the embodiment of FIGURES 1–5 if desired.

In general, the construction disclosed in FIGURES 1–5 is preferred in high pressure applications, while the embodiment of FIGURES 6–9 is preferred in low pressure applications because of its simplified construction.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

What is claimed is:

1. A valve mechanism comprising a valve body having a longitudinally extending cavity therein, an annular valve seat formed in said cavity, a high pressure port communicating with said cavity on one side of said valve seat and a working port communicating with said cavity on the opposite side of said valve seat; a first valve member longitudinally slidable in said cavity having means on one end thereof for engaging said valve seat, and a passageway extending longitudinally therethrough defining an annular valve seat in said one end; a second valve member having an annular surface for engaging said passageway valve seat; and means for effecting a relative longitudinal movement between said valve body and said second valve member, said relative movement in one direction being operable to effect engagement of the valve seat engaging means of said first valve member with said cavity valve seat and to communicate said passageway with said working port through said passageway valve seat, said relative movement in the opposite direction being operable to effect engagement of the annular surface of said second valve member with said passageway valve seat and to communicate said high pressure port with said working port, said second valve member having portions extending from said surface means on opposite sides thereof which reduce in cross-section in a direction away from said surface means, said portions serving to control the amount of flow to and from said working port in response to the amount of said relative movement in said opposite direction and said one direction respectively.

2. A valve mechanism as defined in claim 1 wherein said second valve member portions comprise a first frusto-conical element for relative movement through said passageway valve seat and a second larger frusto-conical element for relative movement through said cavity valve seat.

3. A valve mechanism as defined in claim 1 wherein said second valve member portions comprise frustums of a spherical element.

4. A valve mechanism as defined in claim 1 including spring means acting between said valve body and said first valve member resiliently urging the latter into a position of engagement with said cavity valve seat.

5. A valve mechanism comprising a valve body having a longitudinally extending cavity therein, an annular valve seat formed in said cavity, a high pressure port communicating with said cavity on one side of said valve seat and a working port communicating with said cavity on the opposite side of said valve seat; a first valve member longitudinally slidable in said cavity having means for engaging said valve seat, and a longitudinal passageway formed therein defining an annular valve seat; spring means operatively connected with said valve body and said first valve member for resiliently urging the latter in a direction to engage the annular surface thereof with said valve seat, sealing means between said valve body and the exterior of said first valve member, said high pressure port communicating with said cavity exteriorly of said first valve member between said valve seat and said sealing means, the outer periphery of the annular surface of said first valve member engaging said seat having a diameter less than the diameter of said sealing means so as to provide on said first valve member a resultant surface area facing in the direction of said cavity valve seat, said spring means being of a strength to yield and permit said first valve member to move away from said cavity valve seat in response to a predetermined pressure in said high pressure port acting on said resultant surface area, a second valve member having an annular surface for engaging said passageway valve seat; and means for effecting a relative longitudinal movement between said valve body and said second valve member, said relative movement in one direction being operable to effect engagement of the valve seat engaging means of said first valve member with said cavity valve seat and to communicate said passageway with said working port through said passageway valve seat, said relative movement in the opposite direction being operable to effect engagement of the annular surface of said second valve member with said passageway valve seat and to communicate said high pressure port with said working port.

6. A valve mechanism as defined in claim 5 wherein said second valve member has a first tapered portion thereon for relative movement through the associated valve seat in said cavity means to control the amount of flow through the latter in accordance with the longitudinal position of said first tapered portion with respect thereto and a second tapered portion thereon for relative movement through the associated passageway valve seat to control the amount of flow through the latter in accordance with the longitudinal position of said second tapered portion with respect thereto.

7. A valve mechanism as defined in claim 6 wherein said second valve member is slidably mounted in said valve body and extends outwardly therefrom in a direction away from said first valve member.

8. A valve mechanism comprising a valve body having cavity means formed therein, a pair of annular valve seats formed in said cavity means, a high pressure port communicating with one side of each of said valve seats within said cavity means, a working port associated with each of said valve seats communicating with the other side of the associated valve seat within said cavity means; a first pair of valve members longitudinally slidable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; and means for effecting a relative longitudinal movement in either direction between said valve body and said second valve members, said motion effecting means being operable in one direction to communicate the working port associated with one of the valve seats in said cavity means with said high pressure port and the other of said working ports with the associated passageway, said motion effecting means being operable in the opposite direction to communicate said other working port with said high pressure port and said one working port with the associated passageway, each of said second valve members having a first tapered portion thereon for relative movement through the associated valve seat in said cavity means to control the amount of flow through the latter in accordance with the longitudinal position of said first tapered portion with respect thereto and a second tapered portion thereon for relative movement through the associated passageway valve seat to control the amount of flow through the latter in accordance with the longitudinal position of said second tapered portion with respect thereto.

9. A valve mechanism comprising a valve body having cavity means formed therein, a pair of annular valve seats formed in said cavity means, a high pressure port communicating with one side of each of said valve seats within said cavity means, a working port associated with each of said valve seats communicating with the other side of the associated valve seat within said cavity means; a first pair of valve members longitudinally slidable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; means for effecting a relative longitudinal movement in either direction between said valve body and said second valve members, said motion effecting means being operable in one direction to communicate the working port associated with one of the valve seats in said cavity means with said high pressure port and the other of said working ports with the associated passageway, said motion effecting means being operable in the opposite direction to communicate said other working port with said high pressure port and said one working port with the associated passageway, spring means operatively connected with said valve body and each of said first valve members for resiliently urging the latter in a direction to engage the annular surface thereof with the associated valve seat in said cavity means, and sealing means between said valve body and the exterior of each of said first valve members, said high pressure port communicating with said cavity means exteriorly of each of said first valve members between the associated valve seat in said cavity means and said sealing means, the outer periphery of the annular surface of each of said first valve members engaging the associated seat in said cavity means having a diameter less than the diameter of the associated sealing means so as to provide on each of said first valve members a resultant surface area facing in the direction of the associated valve seat in said cavity means, the spring means for each of said first valve members being of a strength to yield and permit each first valve member to move away from the associated valve seat in said cavity means in response to a predetermined pressure in said high pressure port acting on the associated resultant surface area.

10. A valve mechanism comprising a valve block having a pair of parallel bores formed therein, a valve block insert fixed within each of said bores, said inserts having cavity means formed therein, a pair of annular valve seats formed in said cavity means, a high pressure port communicaing with one side of each of said valve seats within said cavity means, a working port associated with each of said valve seats communicating with the other side of the associated valve seat within said cavity means; a first pair of valve members longitudinally slidable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; and means for effecting a relative longitudinal movement in either direction between said valve block and said second valve members, said motion effecting means being operable in one direction to communicate the working port associated with one of the valve seats in said cavity means with said high pressure port and the other of said working ports with the associated passageway, said motion effecting means being operable in the opposite direction to communicate said other working port with said high pressure port and said one working port with the associated passageway.

11. A valve mechanism comprising a valve block having a pair of parallel bores formed therein, a pair of annular valve seats formed in said bores, a high pressure port communicating with one side of each of said valve seats within said bores, a working port associated with each of said valve seats communicating with the other side of the associated valve seat within the associated bore; a first pair of valve members longitudinally slidable in said bores, each of said first valve members having means thereon for engaging a valve seat in the associated bore and a longitudinally extending passageway therein, each of said passageways having a valve seat formed therein; a second valve member for each of said first valve members having means for engaging the valve seat formed in the passageway thereof; and means for effecting a relative longitudinal movement in either direction between said valve block and said second valve members, said motion effecting means being operable in one direction to communicate the working port associated with one of the valve seats in said bores with said high pressure port and the other of said working ports with the associated passageway, said motion effecting means being operable in the opposite direction to communicate said other working port with said high pressure port and said other working port with the associated passageway.

12. A valve mechanism comprising a valve body having cavity means formed therein, a pair of annular valve seats formed in said cavity means, a high pressure port communicating with one side of each of said valve seats within said cavity means, a working port associated with each of said valve seats communicating with the other side of the associated valve seat within said cavity means; a first pair of valve members longitudinally slidable in said cavity means, each of said first valve members having means thereon for engaging a valve seat in said cavity means and a longitudinally extending passageway therein, each of said passageways having a valve seat formed therein; a second valve member for each of said first valve members having means for engaging the valve seat formed in the passageway thereof; means for effecting a relative longitudinal movement in either direction between said valve body and said second valve members; and spring means resiliently urging said motion effecting means into a null position wherein all of said valve seats are engaged, said motion effecting means being operable in one direction away from said null position to communicate the working port associated with one of the valve seats in said cavity means with said high pressure port and the other of said working ports with the associated passageway, said motion effecting means being operable in the opposite direction to communicate said other working port with said high pressure port and said one working port with the associated passageway.

13. A valve mechanism comprising a valve body including a valve block having a pair of parallel bores extending therethrough, each of said bores having a counterbore formed in one end thereof, a valve body insert fixed in each of said counterbores, means forming a first valve seat between each valve block bore and the associated counterbore, each of said valve body inserts having a central bore formed therein, a first valve member slidably mounted in each insert bore and having means for engaging the associated first valve seat, spring means disposed in each insert bore resiliently urging the associated first valve member in a direction to engage the associated valve seat, each of said first valve members having a central passageway formed therein, a second valve seat formed in each of said passageways, a second valve member slidably mounted in each of said valve block bores, each of said second valve members having means for engaging the associated second valve seat, means for maintaining said second valve members in a position of engagement with said second valve seats and for alternately effecting movement of one of said second valve members in one direction and a corresponding movement of the other in the opposite direction or said one second valve member in the opposite direction and a corresponding movement of said other second valve member in said one direction, said valve body having a pair of working ports and a high pressure port, means for communicating each of said working ports with one side of an associated first and second valve seat, and means for communicating said high pressure port to the opposite side of each first valve seat exterior of the associated second valve member.

14. A valve mechanism as defined in claim 13 wherein each of said valve body inserts has an annular groove formed in its outer periphery and a passage extending from said annular groove to the associated insert bore, said last-mentioned means including said annular grooves and passages and means for communicating said annular grooves with each other and with said high pressure port.

15. A valve mechanism as defined in claim 14 wherein each of said valve body inserts has a second annular groove formed in its outer periphery in longitudinally spaced relation to said first-mentioned groove and a passage extending from said second annular groove to the associated insert bore at a portion to communicate with the associated first valve member passageway on a side of the second valve seat therein opposite from the associated second valve member, said valve body having a low pressure port formed therein and means for communicating said low pressure port with both of said second annular grooves.

16. A valve mechanism as defined in claim 13 wherein each of said first valve seat forming means comprises a cylindrical member fixedly mounted in the associated valve body insert at the inner end thereof in concentric relation to the bore therein, each of said cylindrical members having an inwardly extending annular flange defining a first valve seat.

17. A valve mechanism comprising a valve body having a pair of parallel bores extending therethrough, each of said bores having a counterbore formed in one end thereof defining with the associated bore an annular shoulder providing a first valve seat; a first valve member slidably mounted in each of said counterbores, each of said first valve members having an end surface for engaging the associated first valve seat, a longitudinal passageway extending therethrough and a second valve seat in said passageway adjacent said first valve seat engaging surface, spring means within each counterbore operatively connected with the valve body and associated first valve member for resiliently urging the latter toward the associated first valve seat; a second valve member slidably mounted in each of said valve body bores and having an annular surface for engaging the associated second valve seat; said valve body having a high pressure port and a a pair of working ports formed therein; means communicating said high pressure port with each of said counterbores adjacent the associated first valve seat exteriorly of the associated first valve member; and means communicating each of said working ports with a valve body bore adjacent the associated first valve seat.

18. A valve mechanism as defined in claim 17 wherein said high pressure port comprises an opening formed in said valve body between said bores and extending transversely with respect thereto and wherein said high pressure port communicating means comprises a pair of passages extending diagonally between said opening and the respective valve body counterbore.

19. A valve mechanism as defined in claim 18 wherein said valve body has a low pressure opening formed therein between said counterbores in parallel relation to said high pressure opening and passages extending diagonally from said low pressure opening to said counterbores respectively adjacent the outer end thereof.

References Cited in the file of this patent

UNITED STATES PATENTS

| | | |
|---|---|---|
| 1,595,458 | Doolittle | Aug. 10, 1926 |
| 2,478,002 | Mott | Aug. 2, 1949 |
| 2,518,852 | Annin | Aug. 15, 1950 |
| 2,534,509 | Franck | Dec. 19, 1950 |
| 2,636,581 | Bitler | Apr. 28, 1953 |
| 2,700,986 | Gunn | Feb. 1, 1955 |
| 2,725,890 | Kanuch | Dec. 6, 1955 |
| 2,905,198 | Peeps et al. | Sept. 22, 1959 |

FOREIGN PATENTS

| | | |
|---|---|---|
| 16,061 | Great Britain | Oct. 2, 1902 |
| 721,529 | Great Britain | Jan. 5, 1955 |